(12) United States Patent
Nilakantan et al.

(10) Patent No.: US 7,440,393 B2
(45) Date of Patent: Oct. 21, 2008

(54) METHOD AND SYSTEM FOR MANAGING COMMUNICATION IN A DATA NETWORK

(75) Inventors: Chandrasekharan Nilakantan, Cupertino, CA (US); Gary M. Jaszewski, Los Gatos, CA (US)

(73) Assignee: Scalent Systems, Inc., Palo Alto, CA (US)

( * ) Notice: Subject to any disclaimer, the term of this patent is extended or adjusted under 35 U.S.C. 154(b) by 704 days.

(21) Appl. No.: 11/008,441

(22) Filed: Dec. 9, 2004

(65) Prior Publication Data

US 2006/0126654 A1 Jun. 15, 2006

(51) Int. Cl.
*H04J 1/16* (2006.01)

(52) U.S. Cl. ...................... 370/216; 370/431

(58) Field of Classification Search .......... 370/216, 370/217, 218, 219, 220, 221, 222, 227, 225, 370/400, 312, 389, 431, 449, 497
See application file for complete search history.

(56) References Cited

U.S. PATENT DOCUMENTS 4,562,575 A * 12/1985 Townsend ................ 714/11
7,116,674 B2 * 10/2006 Shi ........................ 370/419

2002/0126635 A1 9/2002 Sugiyama et al.
2004/0156353 A1 * 8/2004 Bevan et al. ............. 370/351

* cited by examiner

*Primary Examiner*—Brenda Pham
(74) *Attorney, Agent, or Firm*—William L. Botjer

(57) ABSTRACT

The present invention provides a method and system for managing communication in a data network. The method and system involves monitoring the communication channels at the host level. The hosts are updated with the monitoring information following which they take a coordinated decision in cases of failure of a channel. The data network comprises a plurality of hosts, which are connected to each other through a plurality of channels. A monitor host is elected out of the plurality of hosts to periodically broadcast a system state packet to the plurality of hosts. The system state packet contains information about the state of the plurality of channels and the plurality of hosts for a given channel. Each of the plurality of hosts compares the observed state of channels, as observed by it, with the reported state as reported in the system state packet. In case a host identifies a discrepancy between the observed state and the reported state, it broadcasts a host state packet, updating the monitor host about the observed state. The monitor host, on the basis of the information contained in the host state packet, updates the system state packet and broadcasts the updated system state packet to the plurality of hosts. Based on the updated system state packets, each of the plurality of hosts may select an alternate optimal channel for communication in case a channel fails.

21 Claims, 12 Drawing Sheets

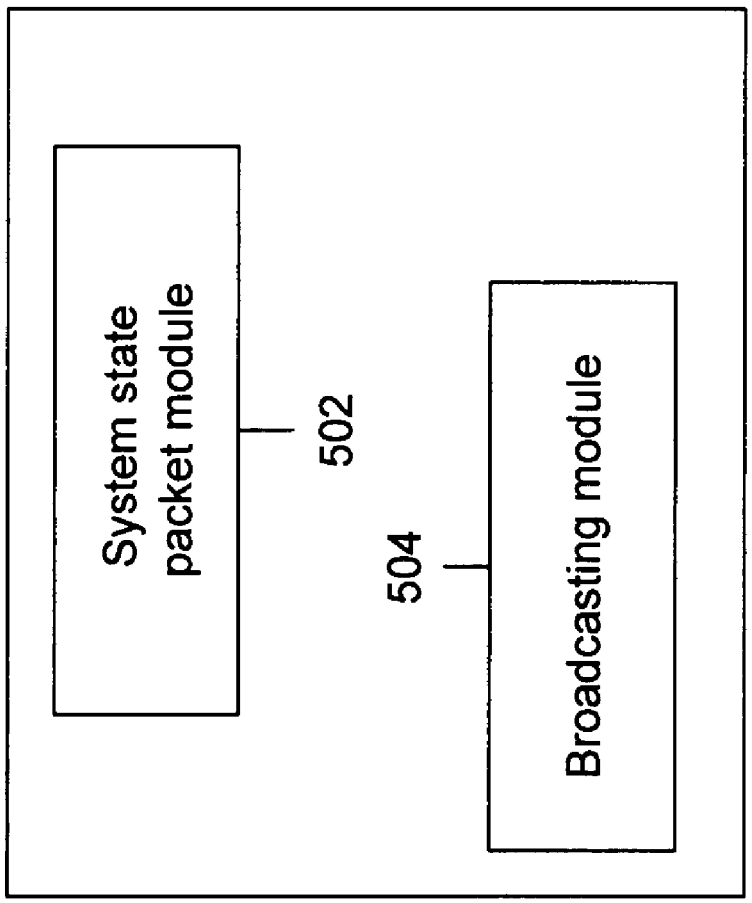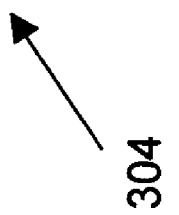
FIG 5

METHOD AND SYSTEM FOR MANAGING COMMUNICATION IN A DATA NETWORK

BACKGROUND

The present invention relates in general to the field of network communication. Specifically, the present invention provides a method and system for coordinated monitoring and failure detection of one or more Local Area Network channels (LAN channels), thereby restoring full connectivity between hosts in the network.

Networks can be broadly classified as Local Area Networks (LANs), Metropolitan Area Networks (MANs) and Wide Area Networks (WANs). Of these, a LAN is a system that is restricted to a few miles and uses high-speed connections. It is a short-haul communication system that connects electronic devices in a building or a group of buildings within a few square kilometers. The electronic devices may include hosts (processing units such as computers, printers or other peripheral devices), controllers, switches, and gateways. These electronic devices in the network communicate with each other through communication channels. These communication channels are generally referred to as LAN channels. Underlying a LAN channel are various physical devices. Examples of the physical devices include LAN adapters that connect various hosts to the network, a cable or a bus that connects the LAN adapters to a port on a network hub, the network switches that provide connectivity to each host, and the cables or buses that interconnect these network switches.

The full operation of a LAN channel may be disrupted by a failure in any one of these underlying physical devices. Such a failure is commonly referred to as a 'single point of failure'. A single host may lose its ability to communicate on the LAN channel if its LAN adapter fails. The loss of communication can also take place in the case of a failure in the cable connecting a LAN adapter to a network switch, or the port on the network switch to which the host connects. The failure of some physical devices might also cause several hosts to lose their ability to communicate on the LAN channel. For example, if one of the network switches underlying a LAN channel fails, then all the hosts that are connected through that network switch will lose their ability to communicate on that LAN channel. However, other hosts, which connect to the LAN channel through an operational underlying network switch, may not lose their ability to communicate on that same LAN channel. This is an instance of a partially operational LAN channel. A LAN channel is said to be fully operational if connectivity to that LAN channel is operational for all hosts configured to communicate on that LAN channel.

Resiliency is the ability of the network to maintain a fully operational communication channel, in spite of the failure of one or more physical devices underlying the communication channel. This preserves the ability of all the hosts to communicate with each other. Networks can be designed in a variety of ways, providing varying degrees of resiliency. For example, a host may be configured with a plurality of LAN adapters, each of which connects the host to the same LAN channel, but only one of them (known as the active LAN adapter) is used at any time. The others (known as standby LAN adapters) remain inactive. If either the active LAN adapter or the cable connecting the active LAN adapter to the network switch fails, a standby LAN adapter can be used to restore its connectivity to the LAN channel. If all of the hosts are configured in this manner, then the LAN channel can remain operational even in the event of the failure of the active LAN adapter in the multiple hosts. On the other hand, if the network switch that provides connectivity to one or more hosts fails, then the LAN channel may not be fully operational. This could happen even when all the hosts are configured with a plurality of LAN adapters, unless multiple network switches are used to create the LAN channel, or the active and standby LAN adapters in each host are connected to a different network switch, and all the network switches underlying the LAN channel are interconnected to each other. Such a configuration would enable the LAN channel to remain fully operational in spite of the failure of any one physical component underlying that LAN channel.

However, in addition to the additional physical network devices and interconnections, a control is required to ensure that only one path among the plurality of physical paths possible under such a configuration is the underlying path through which the communication takes place. Without this control, network loops may be created in the network, and these loops can cause a highly undesirable effect on the LAN channel, e.g., broadcast storms, and the failure of the LAN channel to operate efficiently under certain conditions.

Therefore, a method is required to maintain the optimality of the underlying path, as far as its performance is concerned. The underlying path between two hosts is optimal if that path traverses a minimum number of intervening switches. This minimizes latency in communication. Without a method to coordinate and control the selection of an alternate path in the event of a failure in the LAN channel, the alternate path may include the traversal of more switches than were included in the original path. In this scenario, although the network is resilient from a connectivity perspective, it is suboptimal from a performance perspective.

There are techniques available in the art for choosing a path at the time of the failure of a channel. One such technique is the Spanning Tree Protocol (STP). The STP defines a tree that spans all the switches in the network. Further, the STP forces certain redundant data paths into a standby (blocked) state. If one network segment in the STP becomes unreachable, the STP algorithm reconfigures the spanning-tree topology and re-establishes the link by activating the standby path. The algorithm calculates the cost of communication of all the possible tree formations and selects the one with the lowest cost of communication. The cost of communication of a segment of the channel is defined as a standard data rate divided by the bandwidth of the segment and is typically based on a guideline established as part of 802.1d of IEEE standards. The aggregate of all the costs of segments throughout the channel is known as cost of communication of that channel.

Although, the STP tries to optimize the communication between any two points in a network, it fails to ensure an optimal path between two hosts at the time of the failure of the channel. This is because there is no provision for updating the STP regarding the failure of a communication channel outside its realm of operation. Other limitations of the STP include its complexity and high cost of operation. The STP also requires intricate network design, exhaustive failure testing, and expensive maintenance. The STP also carries a huge convergence time, which results in latency at the time of the failure of the channel. Latency is the delay in the communication of data packets in the network, and is a result of the processing of a packet as it propagates from one node to another in the network.

To achieve optimal communication in a network along with minimum latency, the communication status at every node in the network has to be dynamically monitored, and usage of network resources has to be coordinated when a communication channel fails. There are systems available in the prior art that provide techniques for monitoring and coordinating usage of resources in a network. One such technique known in the art is described in U.S. Patent Application No. US20020126635, entitled 'System and Method for Switching between Frequency Channels in Wireless LAN', filed by the KDDI Corporation. The technique provides a method for switching frequencies in a wireless LAN. According to this technique, a manager, which is a part of a switching system, monitors the line condition with the help of the stations. The line condition, as found by the manager, is then communicated to a frequency channel switch. The frequency channel switch selects the frequency channel on the basis of the judgment of a judging unit. In the case of a changeover to other communication channels, the switching unit sends a request for the changeover to all stations, and coordinates a changeover to the alternate communication channel. The technique is related to preserving the overall quality of communication, by dynamically monitoring the state of communication. However, the system does not address the method of recovery from a single point of failure while preserving the optimality of the communication path. Further, the decision to switch is made by the switching apparatus, which may not be optimal for all the stations.

The prior art techniques described above suffer from one or more of the following limitations. First, these techniques are not able to ensure the optimal path while providing resiliency. Second, these techniques do not avoid the latency while identifying an alternate channel, if a channel fails. Third, these techniques do not ensure optimal usage of LAN resources. Fourth, the choice of switching to an alternate channel is unilaterally made by the switching module on behalf of all the hosts. Fifth, the alternate channels are not actively monitored continually for their readiness to be adopted by some or all of the hosts. This potentially causes the hosts to change channels again if the first alternate channel also cannot be adopted.

In light of the above discussion, there is a need for a method and system for providing an optimal path for communication, at times of a failure. The system should employ network resources optimally, thereby minimizing the requirements for worst-case connectivity. The system should also provide a mechanism for choosing an alternate channel with minimum latency, if a channel fails. The system should permit the hosts to participate and coordinate a changeover to an alternate channel. Finally, the system should periodically test the operability of all alternate channels and update all hosts on the status of these alternate channels.

SUMMARY

An object of the present invention is to provide a method and system to ensure an optimal path for communication between some or all of the hosts at times when the currently used communication channel fails.

Another object of the present invention is to provide a method and system for employing optimal network resources, thereby minimizing the requirements for worst-case connectivity.

Yet another object of the present invention is to provide a method and system for choosing an alternate channel with minimum latency if a channel fails.

Still another object of the present invention is to provide a method and system for periodically testing the operability of the alternate channels and updating the hosts with the condition of the alternate channels.

In accordance with an embodiment, the present invention provides a method and system for managing communication in a network. The method and system involves the monitoring of communication channels at the host level. The hosts are updated with the monitoring information based on which they take a coordinated decision if a channel fails.

The network comprises a plurality of hosts. Each host is a data-processing system and is connected to other hosts through a plurality of channels. Each of the plurality of hosts receives system state packets that are broadcast by a monitor host in the network. A system state packet updates the hosts periodically regarding the state of the channels and the state of hosts for a given channel. After receiving the system state packet, each host observes the state of the channels. Each of the hosts updates the observed state of the channel to 'up', if the system state packet has been received on that channel within a channel timeout period. However, if the system state packet is not received within the channel timeout period on a particular channel, the host updates the observed state of that channel to 'down'. After observing the state of the channels, each host compares the observed state with the reported state as reported in the received system state packet. If there is any discrepancy between the observed and the reported state, the host broadcasts a host state packet to the plurality of hosts. The host state packet includes the observed state of the host. The monitor host updates the system state packet, based on the information contained in the host state packet, and broadcasts the updated system state packet, according to a predefined frequency for periodic broadcasting of the system state packet.

Further, each host notifies its internal processes about the updated state of the channels. The internal processes identify an alternate channel on the basis of the updated reported state of the channels and hosts for a given channel, if a channel fails. The identified alternate channel avoids redundant hops between switches, resulting in minimization in latency at times of failure of a channel.

In another embodiment, the present invention provides a method and system for electing a monitor host out of the plurality of hosts. The function of the elected monitor host is to periodically broadcast system state packets to the plurality of hosts on each of the plurality of channels. The election of a monitor host is based upon two parameters. One of the parameters is the priority attached to each of the hosts and the other is the address of the hosts. Each host waits for an election timeout period for the system state packet on all the channels. In case a host does not receive a system state packet within the election timeout period, the host declares itself as the monitor host. Subsequently, it starts broadcasting system state packets to the plurality of hosts in the network. In this manner, there may be multiple hosts in the network that have declared themselves as monitor hosts and are broadcasting system state packets. Each declared monitor host then assesses its claim for the position of monitor host. In order to do this, each declared monitor host compares the values of priority and address, as given in the system state packets (broadcasts by other declared monitor hosts) with its own priority value and address. The declared monitor host with the strongest claim, based on its priority and address, is elected as the monitor host and starts broadcasting the system state packets periodically.

The present invention provides a method and system for enabling host level monitoring in the network and dynamic updating of the hosts with the monitored state. The updating of the hosts with the channel states enables all or some of them to coordinate a change if a channel fails. The coordinated change results in the preservation of the optimality of communication between some or all of the hosts if a channel fails.

BRIEF DESCRIPTION OF THE DRAWINGS

The embodiments of the present invention will hereinafter be described in conjunction with the appended drawings provided to illustrate and not to limit the invention, wherein like designations denote like elements, and in which:

FIG. 5 is a block diagram of a system updating module, in accordance with an embodiment of the present invention;

DESCRIPTION OF PREFERRED EMBODIMENTS

The present invention provides a method and system for managing communication in a data network. The method and system involves monitoring communication channels at the host level. Hosts are updated with monitoring information, after which they take coordinated decisions when a communication channel fails. The coordinated decision in the cases of failure results in selection of an optimal communication channel, as the decision has been taken in accordance with the updated information.

Figure 1:
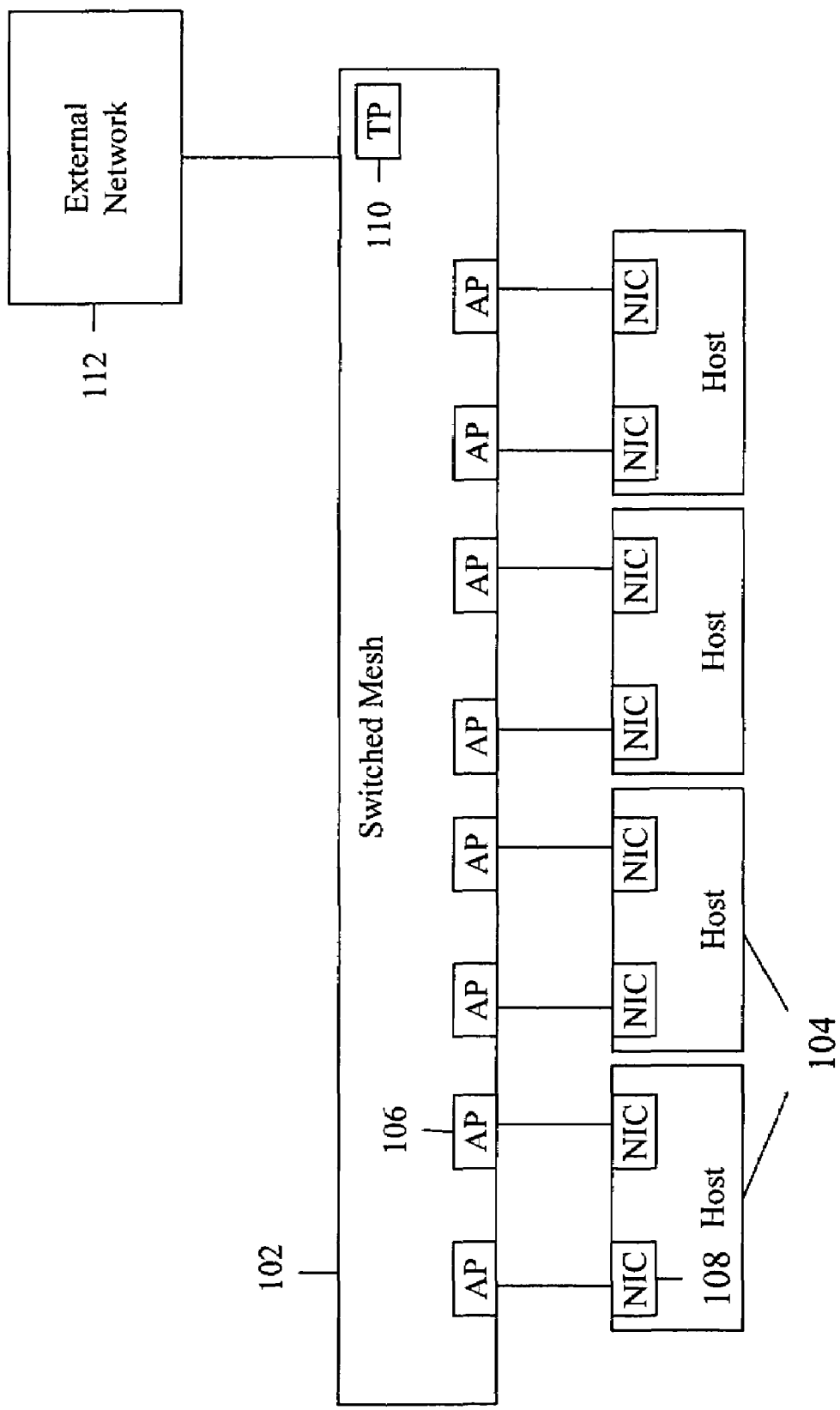
FIG. 1 depicts an exemplary environment in which the present invention operates, in accordance with an embodiment of the present invention.

FIG. 1 depicts an exemplary environment in which the present invention operates, in accordance with an embodiment of the present invention. As shown in the figure, a plurality of hosts 104 connected to each other through a switched mesh network 102. Each host 104 is a data processing unit such as a computer, a server, etc. Each host 104 connects to an access port 106 in the switched mesh network. The connection to access port 106 on the switched mesh is enabled through a Network Interface Card (NIC) 108. Switched mesh network 102 enables the setting up of a multiple communication routes between any two hosts 104 in the data network. Switched mesh network 102 connects to an external network 112 using a trunk port 110.

Figure 2:
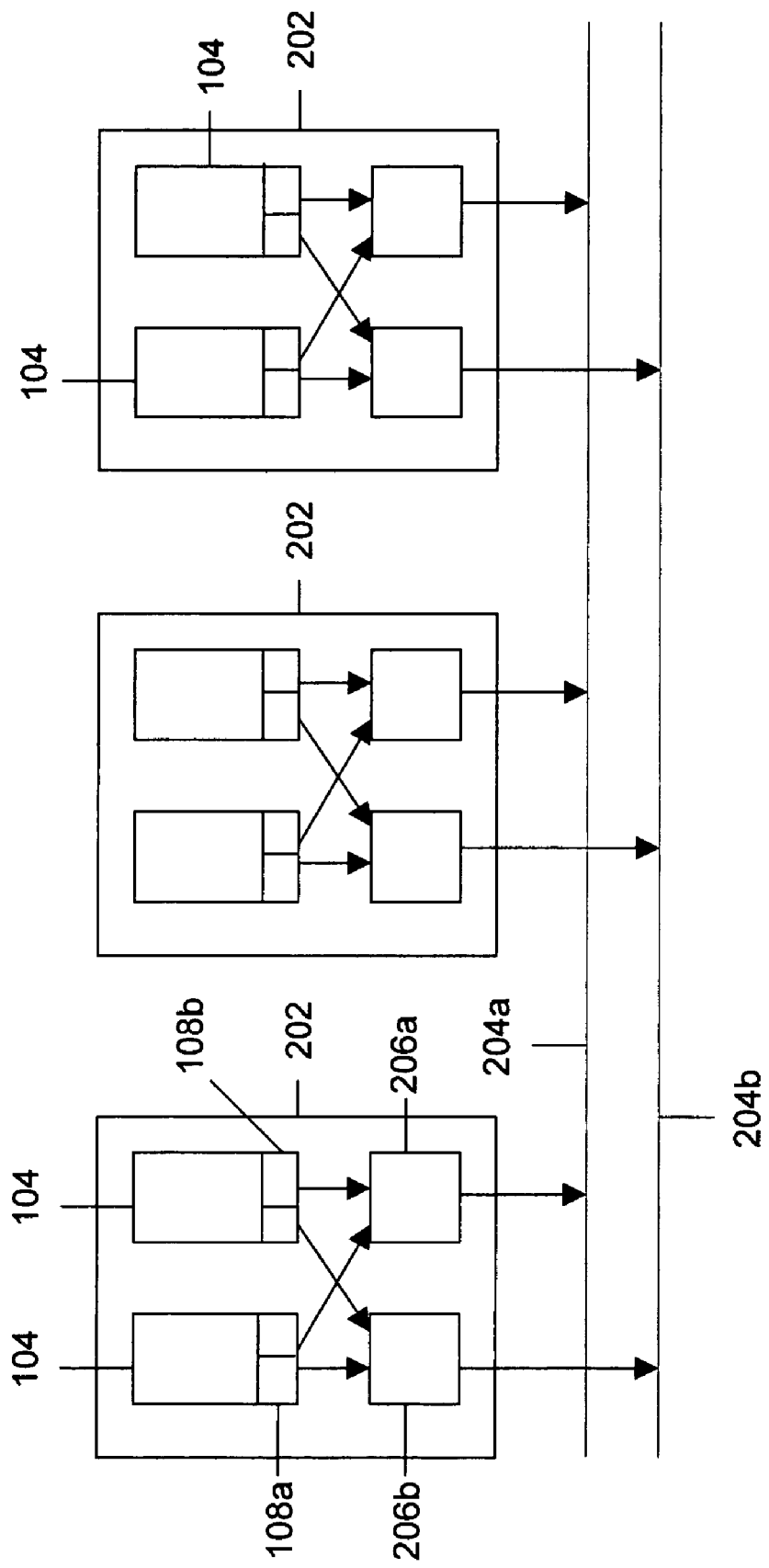
FIG. 2 depicts a specific working environment of the present invention, in accordance with an embodiment of the present invention.

FIG. 2 depicts a specific working environment of the present invention, in accordance with an embodiment of the present invention. As shown in the figure, a plurality of blade servers 202 are connected in a dense switching network. A blade server 202 typically consists of a chassis with multiple computer 'blades' and two or more switches 206 supporting blade connectivity to each other and to other blade servers. Blade servers 202 include hosts 104. Hosts 104 are connected to each other through communication channels 204a and 204b in the data network. Each host 104 is connected to access ports on internal switches 206a and 206b through network interface cards 108a and 108b. Multiple NICs 108 have been provided primarily for resiliency and increased throughput. Along with the other resources of the data network, internal switches 206 have also been distributed among channels 204. For example, switch 206a is connected to channel 204a, while switch 206b is connected to channel 204b.

Figure 3:
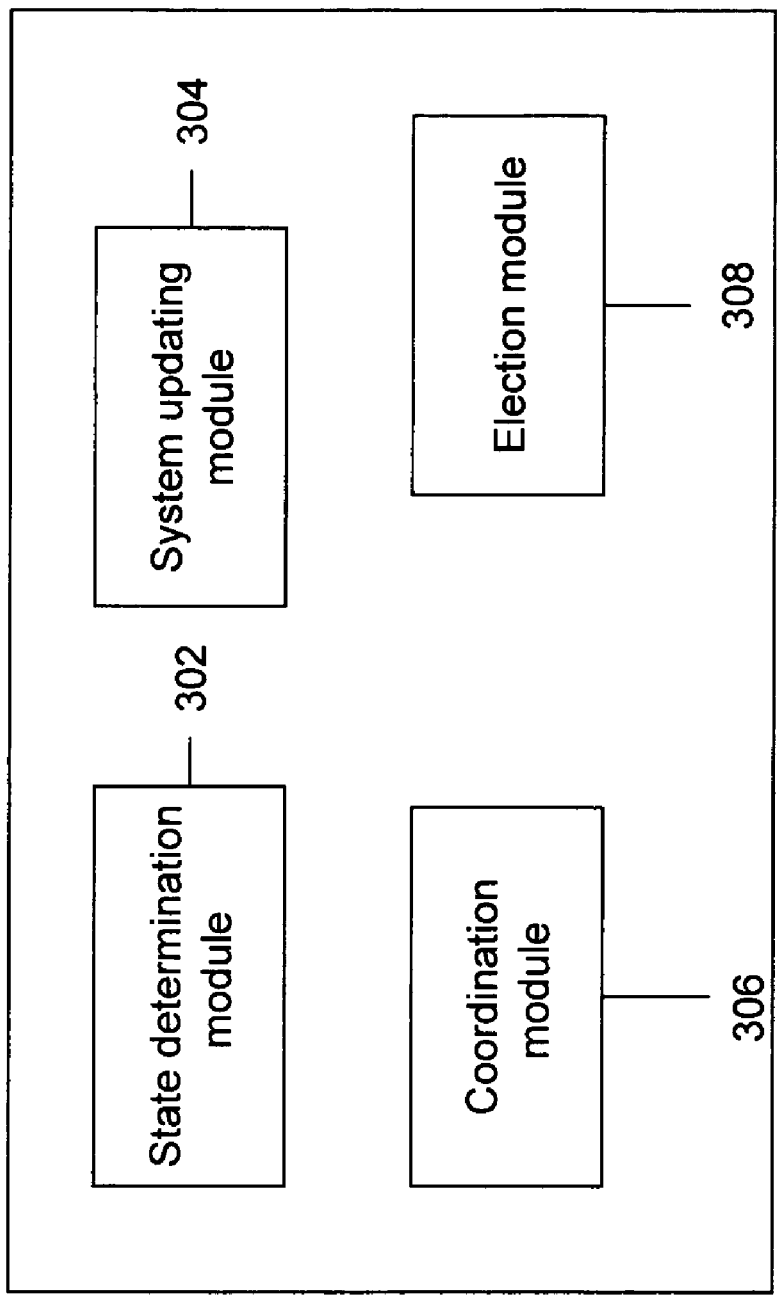
FIG. 3 is a block diagram illustrating a system for managing communication in a network, in accordance with an embodiment of the present invention.

FIG. 3 is the block diagram illustrating a system 300 for managing communication in a data network, in accordance with an embodiment of the present invention. System 300 comprises a state determination module 302, a system updating module 304, a coordination module 306, and an election module 308. State determination module 302 determines the state, i.e., 'up' or 'down', of system 300 that includes determining the state of channels 204 and hosts 104 for a given channel. System updating module 304 updates hosts 104 with the state, as determined by state determination module 302. Coordination module 306 coordinates channel usage if a channel fails. This module selects a channel of communication that should be used to maintain optimal communication in the data network. The optimal channel is selected in terms of the minimum resource requirement, minimum latency period, and minimum number of hops. The decision is based upon the updated information from system updating module 304. Election module 308 elects a monitor host in the data network. The function of the monitor host is to periodically broadcast system state packets containing information about the state of the system to hosts 104. In accordance with an embodiment of the present invention, state determination module 302 comprises election module 308.

Figure 4:
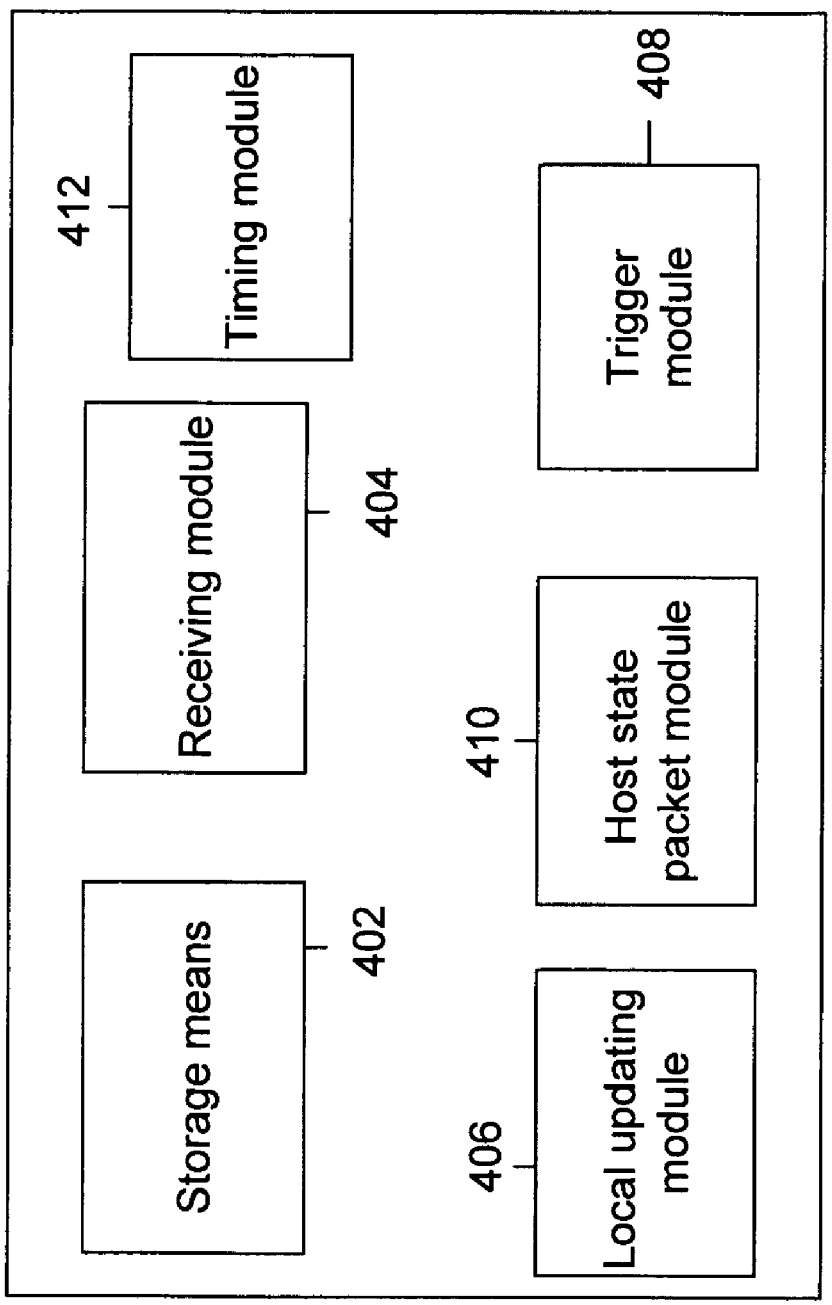
FIG. 4 is a block diagram of a state determination module, in accordance with an embodiment of the present invention.

FIG. 4 is a block diagram of state determination module 302, in accordance with an embodiment of the present invention. State determination module 302 comprises storage means 402, a receiving module 404, a local updating module 406, a trigger module 408, a host state packet module 410, and a timing module 412. Storage means 402 is a data storage unit for storing the determined state of channels 204 and hosts 104 for a given channel. The data storage unit may be a computer hard disk, magnetic tape, CD ROM, etc. Receiving module 404 receives incoming data packets containing state determination information. In accordance with an embodiment of the present invention, there are at least two kinds of data packets that contain state determination information. These are system state packets and host state packets. These two data packets are described in detail later. Local updating module 406 updates the state of channels 204 and hosts 104 for a given channel. Trigger module 408 triggers the generation of host state packets and system state packets after comparing the value of the reported states as reported in the incoming system state packets with the observed state as observed by the host. Host state packet module 410 prepares and broadcasts a host state packet in case trigger module 408 identifies a discrepancy between the observed state and the reported state. Timing module 412 notifies various modules regarding timelines for sending or receiving various data packets.

The details about the system state packets and host state packets are described hereinafter. A system state packet updates hosts 104 about the state of channels 204 and hosts 104 for a given channel. A typical system state packet includes a set of parameters for defining the state of the system. In accordance with an embodiment of the present invention, this set of parameters includes the priority attached with the monitor host that broadcasts the system state packet, the number of channels in the system, the number of hosts in the system, the aggregate state of all the channels, the number of hosts in any version of the state, and an array representing the channel states for each of the hosts. The priority assigned to a host is based on parameters such as its geographical location, the processing capabilities and its connectivity with the network. The priority is in-built and can be modified while configuring the network. In the array, the states of channels 204 are defined by using bit-wise values. In accordance with an embodiment, the value 00 may imply an initializing state, value 01 may imply an unknown state, value 10 may imply an up state, and value 11 may imply a down state. For example, a row of the array comprises strings such as 10110110. Each string indicates the states of channels with respect to a host in the data network. Further, each of the channel states has been represented in a bit-wise value, starting from the right. The first two digits, 10, indicate the state of first channel and the last two digits indicate the state of the last channel. In the above-mentioned string, channel one is in the up state, channel two is in the unknown state, channel three is in the down state, and channel four is in the up state.

A host state packet is broadcast on all the channels if a discrepancy is detected by a host between the reported state and the observed state. A typical host state packet includes the address of the host that broadcasts the host state packet, and the combined state of the channels, as observed by the host. The state of the channels is in bit-wise values, as described earlier.

FIG. 5 is a block diagram of system updating module 304, in accordance with an embodiment of the present invention. System updating module 304 comprises a system state packet module 502 and a broadcasting module 504. System state packet module 502 prepares system state packets by assigning values to a set of parameters in the system state packet. This set of parameters has already been defined in conjunction with the description of the system state packet. Broadcasting module 504 broadcasts the system state packets to hosts 104.

Figure 6:
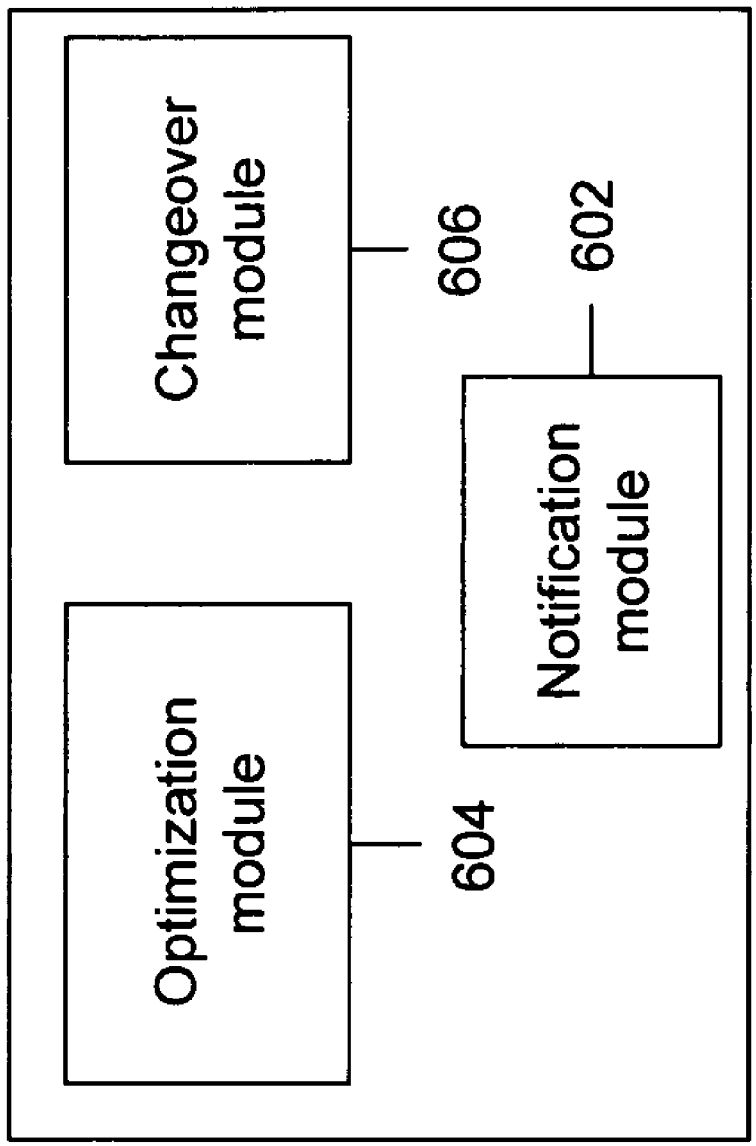
FIG. 6 is a block diagram of a coordination module, in accordance with an embodiment of the present invention.

FIG. 6 is a block diagram of coordination module 306, in accordance with an embodiment of the present invention. Coordination module 306 comprises a notification module 602, an optimization module 604, and a changeover module 606. Notification module 602 notifies the internal processes running within a host about the change in the reported state of channels 204. The appropriate internal processes that possess the local information used by host 104 to make the channel change decision are notified regarding channel change events. These internal processes could be at any layer of the communication stack within the host, such as at the data-link layer, the network layer, the session layer or the application layer. Optimization module 604 selects an alternate channel in the case of failure of a channel. The decision on the alternate optimal channel can be made, based upon the notification provided by notification module 602. Changeover module 606 compares the selected alternate channel and the currently used channel, and in case these channels are different, it coordinates a changeover to the alternate channel if a channel fails. However, in accordance with an alternate embodiment of the present invention, a host 104 may monitor the state of a specific set of hosts 104, before triggering the channel change. In accordance with another embodiment of the present invention, a host 104 may monitor the state of a specific peer host in order to trigger a channel changeover.

Figure 7:
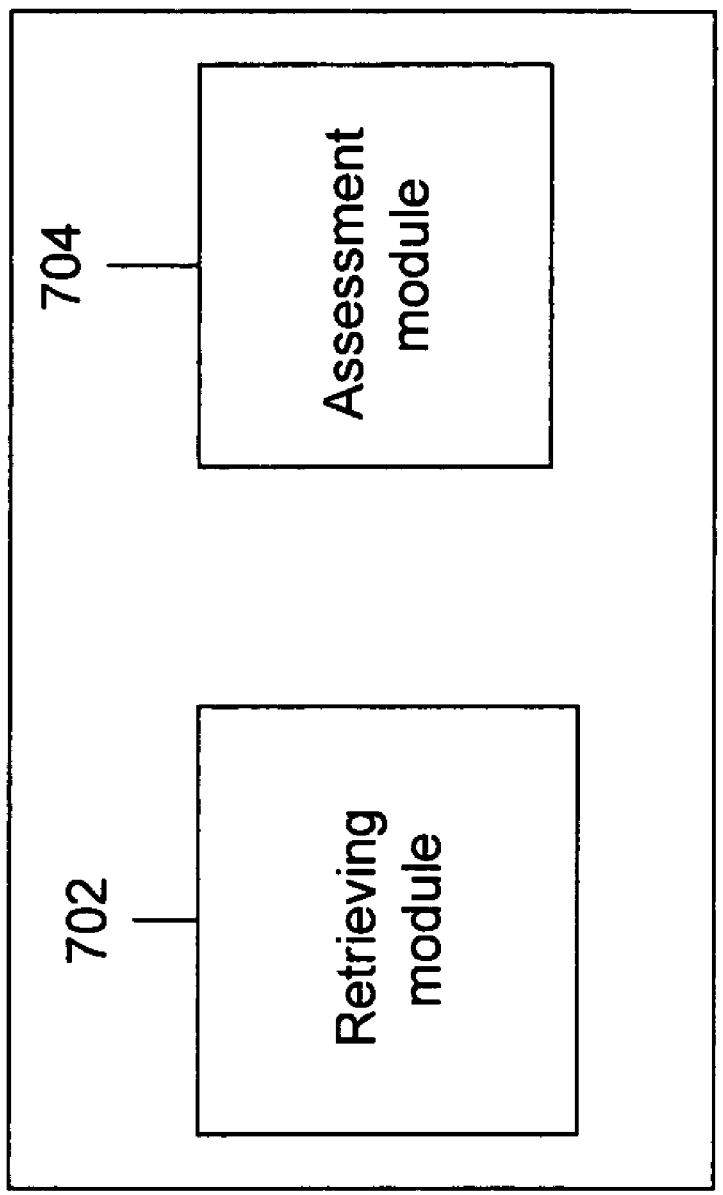
FIG. 7 is a block diagram of an election module, in accordance with an embodiment of the present invention.

FIG. 7 is a block diagram of election module 308, in accordance with an embodiment of the present invention. Election module 308 comprises a retrieving module 702 and an assessment module 704. Retrieving module 702 retrieves the priority and address of the monitor host from the system state packets broadcast by the monitor host. The priority is one of the parameters for assessing a claim for the position of the monitor host. Assessment module 704 assesses the claim of host 104 for the position of monitor host. This claim assessment is based on the comparison of values of the retrieved priority and the configured priority of the host.

Figure 8:
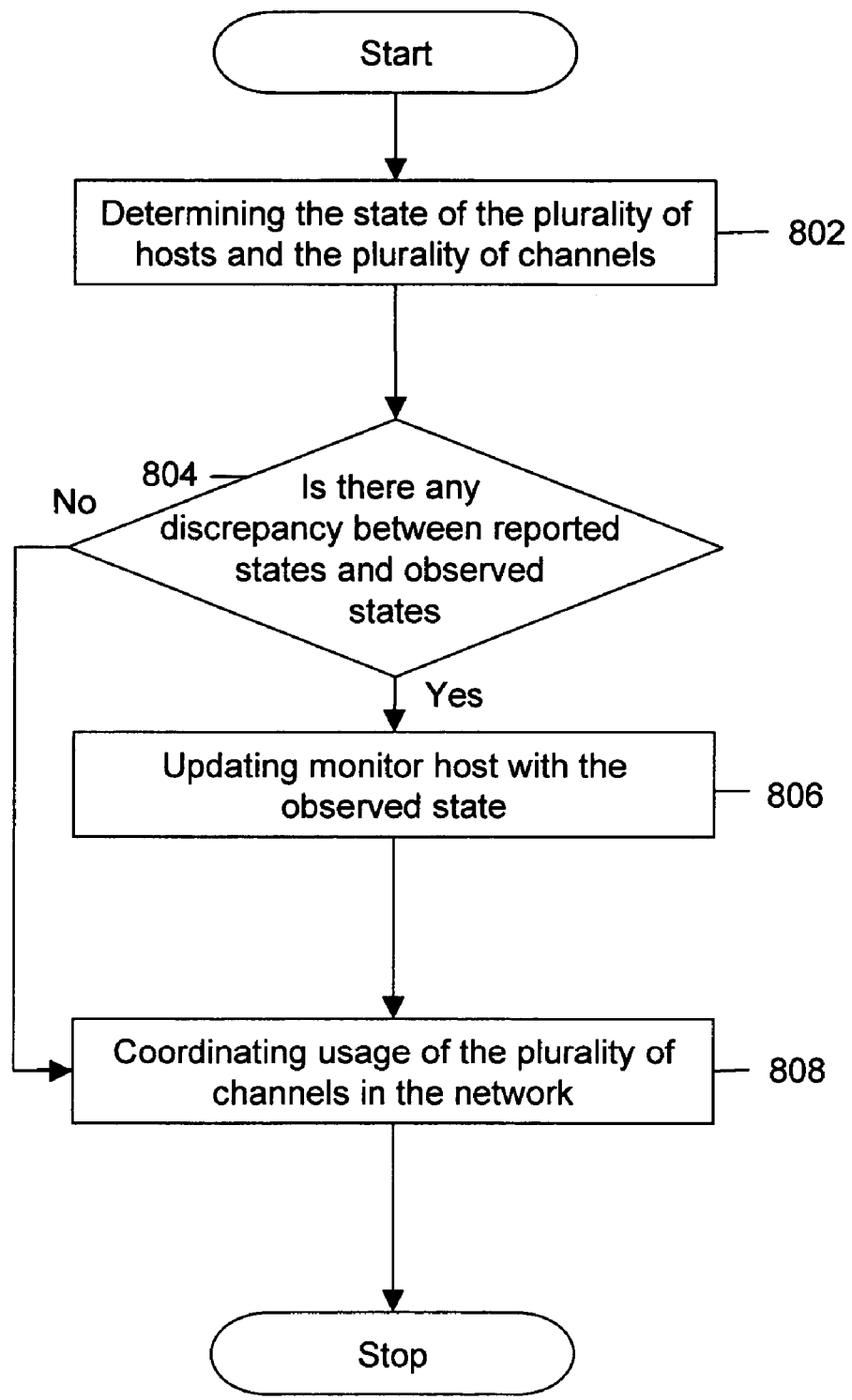
FIG. 8 is a flowchart providing an overview of the method for managing communication between hosts in a data network, in accordance with an embodiment of the present invention.

FIG. 8 is a flowchart providing an overview of the method for managing communication between hosts in a data network, in accordance with an embodiment of the present invention. At step 802, state determination module 302 determines the state of plurality of channels 204 and plurality of hosts 104 for a given channel. At step 804, a check is performed to verify if there is a discrepancy between reported states and the observed states. In case a discrepancy is observed between the reported states and observed states, steps 806 and 808 are performed. At step 806, system updating module 304 updates the monitor host with the determined state. At step 808, coordination module 306 coordinates the usage of channels for communication by selecting an optimal channel out of all the alternate channels available for communication. The coordination in usage is based upon the updated information available with all hosts 104. However, in case no discrepancy is observed between the reported states and observed states, step 808 is performed. At step 808, coordination module 306 coordinates the usage of channels for communication. The coordination in usage is based upon the updated information available with all hosts 104. The coordination may be required even if no discrepancy is identified between the reported and observed states. This is because, there is a possibility of a change in the state of the currently used channel in the observed state as well as in the reported state.

Figure 9:
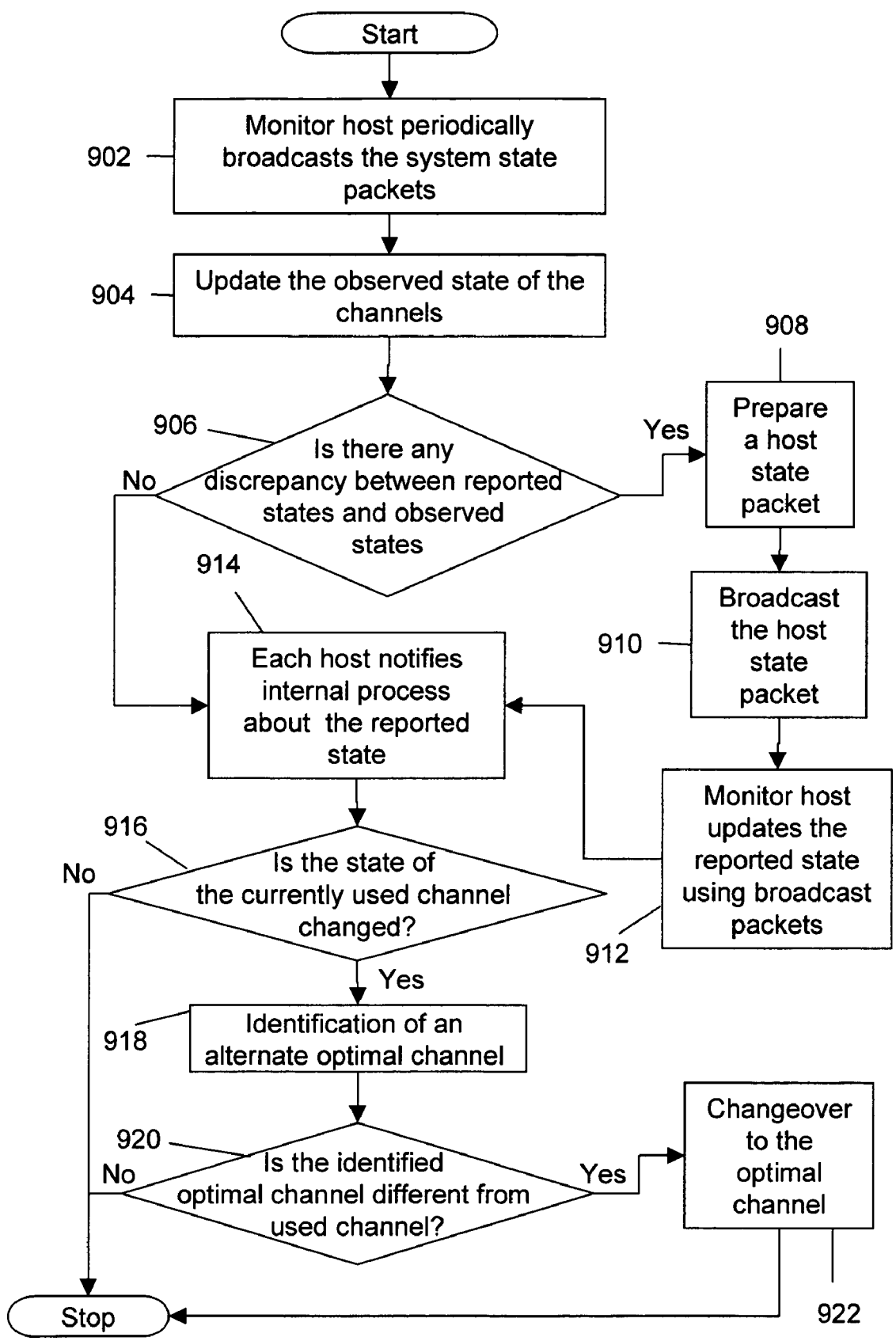
FIG. 9 is a flowchart describing the detailed method for managing communication between hosts in a data network, in accordance with an embodiment of the present invention.

FIG. 9 is a flowchart describing the detailed method for managing communication between hosts in a data network, in accordance with an embodiment of the present invention. The present invention works in a dense switching environment as described in conjunction with FIG. 2, wherein a plurality of blade servers have been used. Each of the blade servers 202 includes at least one host 104. One of hosts 104 is a monitor host. The monitor host periodically broadcasts system state packets to the plurality of hosts. System state packets, as described earlier, include the state of channels 204 and the state of hosts 104 for a given channel.

At step 902, the monitor host periodically broadcasts the system state packets to all the hosts. At step 904, local updating module 406 updates the observed state of the channels. The observed state for a channel is updated as 'up' if a system state packet is received on that channel. Similarly, the observed state for a channel is updated as 'down' if a system state packet is not received on that channel. At step 906, trigger module 408 performs a check to verify any discrepancy between the reported and the observed states. If trigger module 408 could not identify any discrepancy between the reported and observed states, notification module 602 updates internal processes regarding the reported state, as shown at step 914. However, if a host 104 identifies a discrepancy between its observed and reported states, host state packet module 410 prepares a host state packet, as shown at step 908. At step 910, host state packet module 410 broadcasts the host state packet. The host state packet includes the observed state of channels 204, as observed by host 104. At step 912, local updating module 406 in the system located on the monitor host updates the reported state of hosts 104 in the system state packet, and broadcasts the updated system state packet (as per the predefined frequency for periodic broadcasting of the system state packet).

Further, at step 914, notification module 602 notifies the internal processes regarding the reported state of hosts 104. Notifications relating to channel change events are made to the appropriate internal processes that possess the local information that is used by host 104, to make the channel change decision. These internal processes could be at any layer of the communication stack within the host, such as at the data-link layer, the network layer, the session layer, or the application layer. At step 916, a check is performed to verify if there is a change in the state of the currently used channel, as reported in the system state packets. In case the state of the currently used channel has changed, step 918 is performed. At step 918, optimization module 604 identifies an alternate optimal channel in accordance with the updated reported state. At step 920, a check is performed to verify if the identified alternate channel is the same or different from the currently used channel. In case identified optimal channel is different from the currently used channel, step 922 is performed. At step 922, changeover module 606 enables changing over to the optimal channel, in case it is different from the currently used channel. In accordance with another embodiment of the present invention, a host 104 may monitor the state of a specific set of hosts 104 before triggering the channel change. In accordance with yet another embodiment of the present invention, a host 104 may monitor the state of a specific peer host to trigger a channel change.

An integral feature of the invention is the monitoring performed by the monitor host in coordination with the other hosts. The invention also provides a method of electing the monitor host from other hosts 104. The only difference between the functioning of the monitor host and hosts 104 is the periodic broadcasting of system state packets, which is performed by the monitor host. In accordance with an embodiment of the present invention, the two parameters that play a role in the election of the monitor host are the priorities attached to hosts 104 and their respective addresses. In an exemplary embodiment of the present invention, the value of the priority may vary from 0 to 100. The priority value 0 implies that host 104 is not a candidate for the position of the monitor host. In accordance with the exemplary embodiment, the lower value of the priority indicates a stronger claim for the position of monitor host. Further, the value of the priority need not be unique, and more than one host may have the same priority. Unlike the value of the priority, the value of the address is unique and a lower address value indicates a stronger claim for the position of monitor host.

Figure 10A:
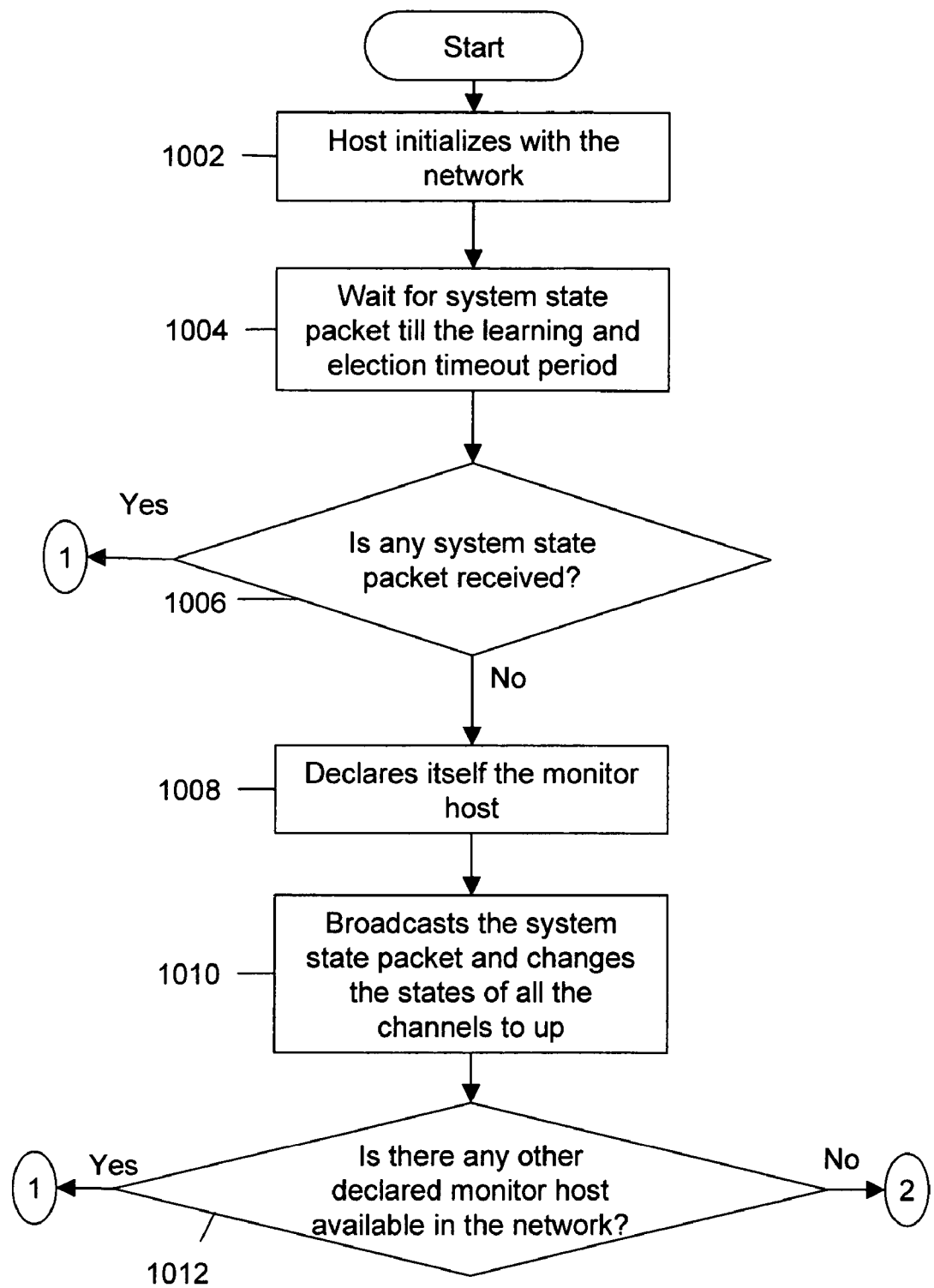
FIG. 10a and FIG. 10b are flowcharts describing the method for electing a monitor host from a plurality of hosts, in accordance with an embodiment of the present invention.
Figure 10B:
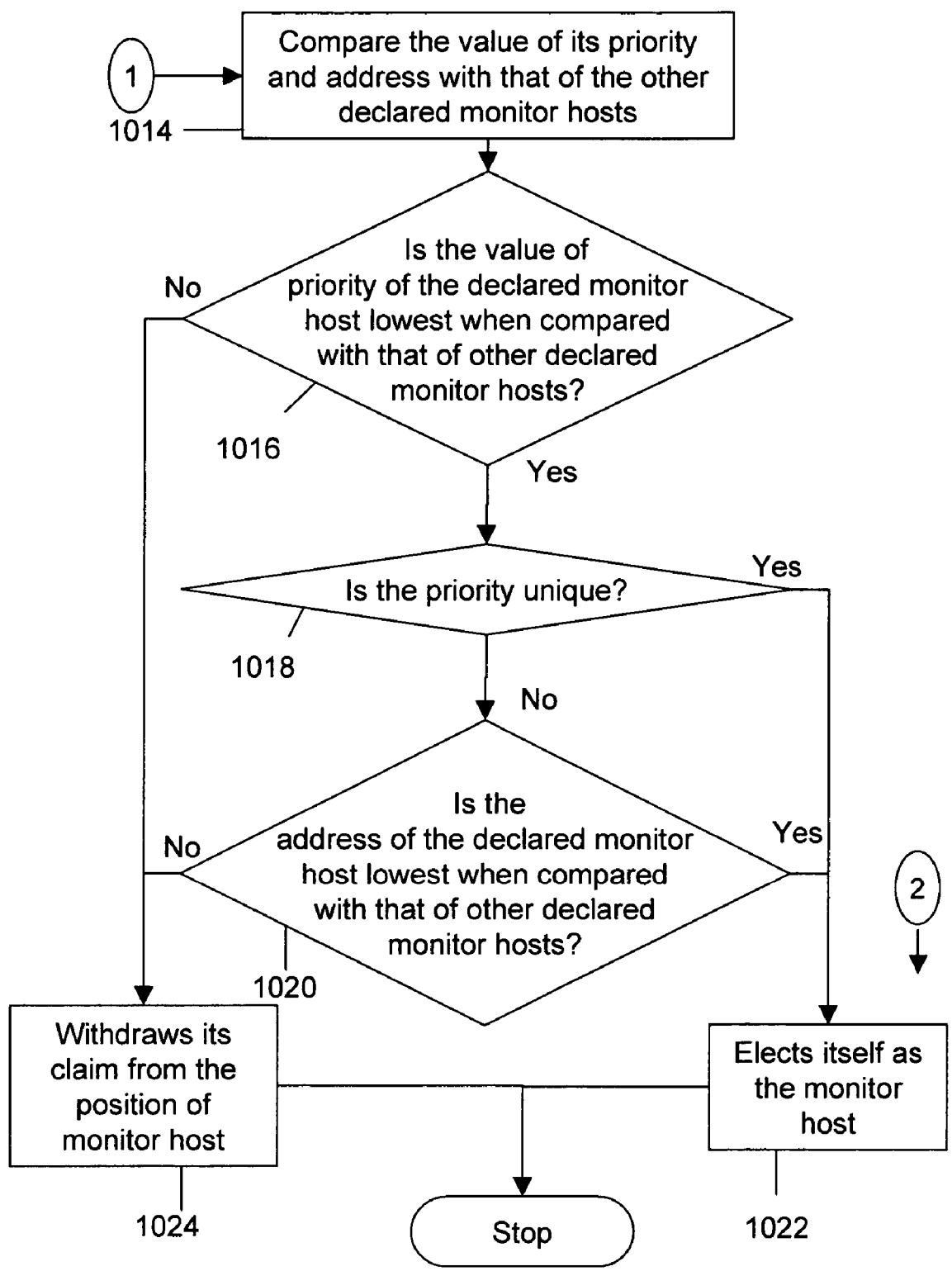

FIG. 10a and FIG. 10b are flowcharts describing the method for electing a monitor host from plurality of hosts 104, in accordance with an embodiment of the present invention. At step 1002, one or more hosts 104 initialize with the data network. As there is no elected monitor host available in the data network, hosts 104 will not receive any system state packet in the learning period. Hosts 104 will not declare themselves the monitor host till the completion of the learning and election timeout period, and will wait for the system state packet as shown at step 1004. At step 1006, receiving module 404 checks the receipt of the system state packet. If the receiving module receives a system state packet, step 1014 is performed. At step 1014, trigger module 408 compares the value of the priority and the address of the host with the priority and the address of the other declared monitor hosts.

However, if all the channels are still in the down state, i.e., the system state packet is not received within the learning and election timeout period on any of the channels at step 1006, step 1008 is performed. At step 1008, host 104 declares itself monitor host. At step 1010, declared monitor host starts broadcasting system state packets using broadcasting module 504, and updates the observed state of all its channels to 'up'. At step 1012, receiving module 404 checks the presence of any other declared monitor host by verifying the receipt of any other system state packet sent by other declared monitor hosts. In case the declared monitor host does not receive any system state packet, step 1022 is performed. At step 1022, declared monitor host elects itself as the monitor host.

However, if it receives one or more system state packets, step 1014 is performed. At step 1014, assessment module 704 compares the values of the priority and address of declared monitor host with the priority and address of the other declared monitor hosts. At step 1016, assessment module 704 checks whether the value of the priority of the declared monitor host is the lowest when compared with the priorities of the other declared monitor hosts. In case the value of the priority is not the lowest, step 1024 is performed. At step 1024, the declared monitor host withdraws its claim for the position of monitor host and discontinues broadcasting the system state packets.

However, in case the value of the priority of the declared monitor host is lowest, as verified at step 1016, step 1018 is performed. At step 1018, assessment module 704 checks whether the priority is unique. In case the value of the priority is unique, step 1022 is performed. At step 1022, declared monitor host 104 elects itself as the monitor host.

In case the value of the priority of the host is lowest but not unique, as identified at step 1018, step 1020 is performed. At step 1020, assessment module 704 compares the address of the declared monitor host 104 with the addresses of the other declared monitor hosts, which have same lowest priority as the declared monitor host. In case the address of the declared monitor host is not the lowest, it withdraws its claim from the position of monitor host, as shown at step 1024, and discontinues broadcasting the system state packets. However, in case the address is the lowest, step 1022 is performed. At step 1022, declared monitor host 104 elects itself as the monitor host.

In the election process, if a multiple number of hosts declare themselves as the monitor host and start broadcasting the system state packets, a broadcasting storm may occur. In accordance with an embodiment of the present invention, a delay in the broadcasting of the system state packets can be introduced to prevent the broadcasting storm. This delay can be referred to as an election delay period. The election delay period is a function of the priority attached to each of the hosts. In accordance with an embodiment of the present invention, the election delay period is calculated as:

Election delay period=(frequency of broadcasting system state packet)*(priority/100)

In accordance with an embodiment of the present invention, the election delay period may also not be unique. This would mean that only those hosts with the lowest value of priority would be the first to declare themselves as the monitor host, and start broadcasting the system state packets.

In case the monitor host is 'down' in the data network, a new monitor host is elected, using the same method as described above. The only difference is in the waiting time. In the case described earlier, hosts 104 wait till the expiry of learning time and election timeout period, while initializing, however, in this case hosts 104 wait only for the election timeout period before making a declaration.

Further, assessment module 704 keeps on assessing the claim of a host 104 for the position of the monitor host. The reason for assessing the claim on a regular basis is to allow the hosts that have initialized on the system to participate in the elections. To assess the claim, assessment module 704 performs the steps described in FIGS. 10a and 10b.

Figure 11:
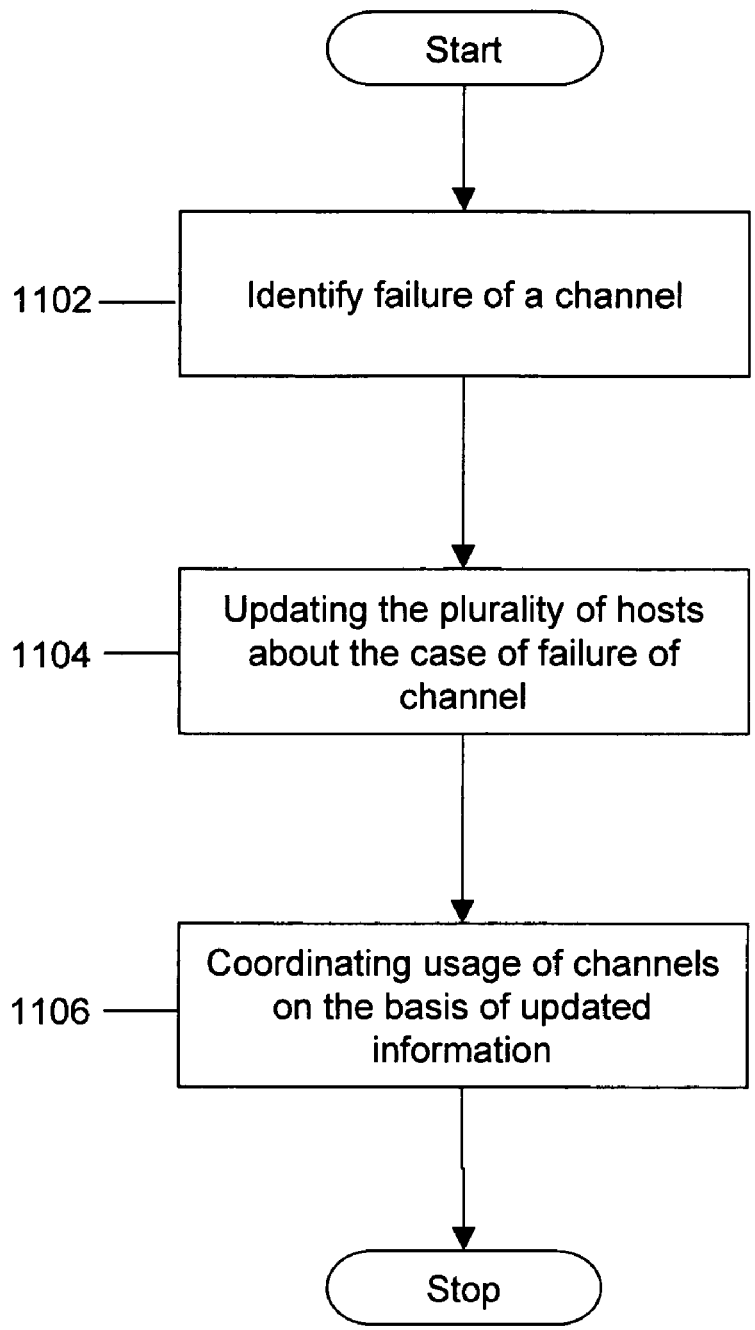
FIG. 11 is a flowchart describing the method for identifying an alternate channel with minimal latency in a data network, in accordance with an alternate embodiment of the present invention.

FIG. 11 is a flowchart describing the method for identifying an alternate channel with minimal latency in a data network, in accordance with an alternate embodiment of the present invention. Latency is introduced in communication in the case of abrupt failures in the currently used channel. At step 1102, a host identifies the case of failure of a channel. At step 1104, the host updates other hosts about the failure of the channel. At step 1106, all the hosts coordinate the usage of channels on the basis of information regarding the failure of a channel. Due to timely updating and coordination in channel usage, the number of hops between switches is maintained at a minimal level. Therefore, the introduced latency is kept to a minimum in the process of communication.

The advantages of the present invention have been described hereinafter. An advantage of an embodiment of the present invention is the optimal channel selection for communication in a data network. The present invention provides a method for monitoring the state of the data network at the host level by using a monitor host. The monitor host also updates the determined state to the plurality of hosts, enabling coordinated changes at the time of the failure of a channel. This monitoring and updating allows a host to select an optimal path on the basis of information regarding the overall state of the data network.

Yet another advantage of the system lies in its optimal usage of resources in the data network. In conventional techniques, in cases of failure of a channel, the choice of an alternate path is always made individually by each of the hosts. This results in a less than optimal communication channel, as the decision has been made without any knowledge regarding the state of the other hosts in the data network. The probability of less than optimal channel forces the need for worst-case connectivity, which would mean more switch ports, inter switch links, etc. In the present invention, each of the plurality of hosts is updated with the state of the other hosts, and hence, can make a coordinated decision on an optimal channel. Selection of the optimal channel reduces the need for redundant connections and minimizes the requirement of resources to address worst-case connectivity.

Another alternate embodiment of the present invention describes the provision of separate VLANs for the movement of management packets such as system state packets and host state packets. The embodiment avoids forwarding such packets over the LAN channels. This will result in further optimization in the usage of network resources and high-speed connectivity.

The system, as described in the present invention or any of its components, may be embodied in the form of a computer system. Typical examples of a computer system include a general-purpose computer, a programmed microprocessor, a micro-controller, a peripheral integrated circuit element, and other devices or arrangements of devices that are capable of implementing the steps constituting the method of the present invention.

The computer system comprises a computer, an input device, a display unit, and the Internet. The computer comprises a microprocessor. The microprocessor is connected to a communication bus. The computer also includes a memory. The memory may include Random Access Memory (RAM) and Read Only Memory (ROM). The computer system further comprises a storage device, which can be a hard disk drive or a removable storage drive such as a floppy disk drive, an optical disk drive, etc. The storage device can also be other similar means for loading computer programs or other instructions into the computer system.

The computer system executes a set of instructions that are stored in one or more storage elements, in order to process input data. These storage elements may also hold data, or other information, as required. A storage element may be in the form of an information source or a physical memory element present in the processing machine.

The set of instructions may include various commands that instruct the processing machine to perform specific tasks, such as the steps that constitute the method of the present invention. The set of instructions may be in the form of a software program. The software may be in various forms, such as system software or application software. Further, the software might be in the form of a collection of separate programs, a program module with a larger program, or a portion of a program module. The software might also include modular programming in the form of object-oriented programming. The processing of input data by the processing machine may be in response to user commands, or in response to results of previous processing or in response to a request made by another processing machine.

While the embodiments of the invention have been illustrated and described, it will be clear that the invention is not limited to these embodiments only. Numerous modifications, changes, variations, substitutions, and equivalents will be apparent to those skilled in the art, without departing from the spirit and scope of the invention, as described in the claims.

What is claimed is:

1. A method for managing communication in a data network, the data network comprising a plurality of channels and a plurality of hosts, wherein each of the plurality of channels is connected to one or more hosts of the plurality of hosts in the data network, wherein each of the plurality of hosts is a data processing system, and wherein a monitor host is elected from the plurality of hosts, the method comprising the steps of:
   a. determining states of the plurality of channels and the plurality of hosts by the monitor host;
   b. updating the one or more hosts with the determined states by the monitor host, wherein the monitor host updates the one or more hosts by broadcasting a system state packet, and wherein the system state packet comprises the determined states;
   c. observing states of the plurality of channels by the one or more hosts;
   d. comparing the observed states with the determined states by the one or more hosts; and
   e. coordinating usage of the plurality of channels for communication in the data network, wherein the coordination is based upon updated states of the plurality of channels and the plurality of hosts, and wherein the updated states are determined by the monitor host based on the comparison performed by the one or more hosts.

2. The method as recited in claim 1, wherein the step of updating the one or more hosts with the determined states further comprises broadcasting one or more host state packets to the plurality of hosts by the one or more hosts that identify at least one discrepancy between the observed states and the determined states, wherein the one or more host state packets comprises the observed states.

3. The method as recited in claim 1, wherein determining the states of the plurality of channels and the plurality of hosts further comprises the steps of:

a. waiting for the system state packet on the plurality of channels;
b. updating the observed states of one or more channels of the plurality of channels to down when the one or more hosts fail to receive the system state packet on the one or more channels of the plurality of channels; and
c. updating the observed states of one or more channels of the plurality of channels to up when the one or more hosts receive the system state packet on the one or more channels of the plurality of channels.

4. The method as recited in claim 2, wherein updating the one or more hosts with the determined states further comprises the steps of:
a. updating the system state packet by the monitor host based on the updated states, wherein the monitor host determined the updated states on the basis of information contained in the one or more host state packets; and
b. broadcasting the system state packet to the plurality of hosts by the monitor host.

5. The method as recited in claim 4, wherein broadcasting the system state packet to the plurality of hosts further comprises the steps of:
a. assigning values to a plurality of parameters in the system state packet, wherein the plurality of parameters define the state of the plurality of channels and the plurality of hosts; and
b. sending the system state packet at a predefined frequency for periodic broadcasting of the system state packet.

6. The method as recited in claim 1, wherein coordinating usage of the plurality of channels further comprises the steps of:
a. notifying internal processes running within the one or more hosts about the updated states by the one or more hosts; and
b. coordinating a change in the usage of the plurality of channels by the one or more hosts.

7. The method as recited in claim 6, wherein coordinating the change in the usage of channels further comprises the steps of:
a. identifying an optimal channel; and
b. changing over to the optimal channel when currently connected channel is different from the identified optimal channel.

8. A method for identifying a channel with minimal latency in a data network, the data network comprising a plurality of channels and a plurality of hosts, wherein each of the plurality of channels is connected to one or more hosts of the plurality of hosts in the data network, wherein each of the plurality of hosts is a data processing system, wherein a monitor host is elected from the plurality of hosts, and wherein the latency results from failure of one or more channels of the plurality of channels, the method comprising the steps of:
a. identifying failure of the one or more channels on the basis of one or more host state packets, wherein the one or more host state packets comprises states of the one or more channels observed by the one or more hosts;
b. updating the plurality of hosts regarding the failure of the one or more channels by broadcasting a system state packet to the plurality of hosts, wherein the system state packet comprises the states of the plurality of channels and the plurality of hosts is reported by the monitor host;
c. updating the system state packet by the monitor host on the basis of the one or more host state packets; and
d. coordinating usage of the plurality of channels by the one or more hosts on the basis of the system state packet.

9. The method as recited in claim 8, wherein identifying the failure of a channel further comprises the steps of:

a. waiting for the system state packet by each of the plurality of hosts;
b. updating the observed states of the one or more channels to be down when the one or more hosts fails to receive the system state packet on the one or more channels; and
c. comparing the observed states of the one or more channels with the reported states as reported in the system state packet, wherein the comparing step is performed by each of the plurality of hosts.

10. The method as recited in claim 9 further comprising the steps of:
a. broadcasting the one or more host state packets to the plurality of hosts by the one or more hosts that identify at least one discrepancy between the reported states and the observed states, wherein the at least one discrepancy is identified while performing the comparison between the observed states of the one or more channels with the reported states;
b. updating the system state packet by including the information about the failure of the channel, wherein the system state packet is updated by the monitor host; and
c. broadcasting the system state packet to the plurality of hosts by the monitor host.

11. The method as recited in claim 8, wherein the step of coordinating usage of the plurality of channels further comprises the steps of:
a. determining an alternate channel from the plurality of channels on the basis of updated information about the states of the plurality of channels, wherein the alternate channel is identified by the one or more hosts; and
b. connecting to the alternate channel by the one or more host.

12. A system for managing communication in a data network, the data network comprising a plurality of channels and a plurality of hosts, wherein each of the plurality of channels is connected to one or more hosts of the plurality of hosts in the data network, wherein each of the plurality of hosts is a data processing system, and wherein a monitor host is elected from the plurality of hosts, the system comprising:
a. a state determination module for determining states of the plurality of channels and the plurality of hosts;
b. a system updating module for updating the one or more hosts with the determined states, wherein the monitor host updates the one or more hosts by broadcasting a system state packet, and wherein the system state packet comprises the determined states;
c. a trigger module for comparing the determined states included in the system state packet with states of the plurality of channels observed by the one or more hosts; and
d. a coordination module for coordinating the usage of the plurality of channels, wherein the coordination being based on updated states of the plurality of channels and the plurality of hosts, and wherein the updated states are determined by the monitor host based on the comparison performed by the one or more hosts.

13. The system as recited in claim 12, wherein the state determination module comprises:
a. a storage means for storing the states of the plurality of channels and the plurality of hosts;
b. a receiving module for receiving the system state packet;
c. a local updating module for updating the state of the plurality of channels and the state of the one or more hosts;
d. a host state packet module for preparing and broadcasting one or more host state packets to the plurality of hosts; and e. a timing module for notifying internal processes about timelines for sending and receiving the system state packet and the one or more host state packets.

14. The system as recited in claim 12, wherein the system updating module comprises:
   a. a system state packet module for preparing the system state packet; and
   b. a broadcasting module for broadcasting the system state packet to the plurality of hosts.

15. The system as recited in claim 12, wherein the coordination module comprises:
   a. an optimization module for selecting an optimal channel of the plurality of channels in case of failure of one or more channels of the plurality of channels;
   b. a changeover module for enabling a change in channel usage; and
   c. a notification module for notifying internal processes within the one or more hosts about the change in the states of the plurality of channels and the plurality of hosts.

16. The system as recited in claim 12 further comprising an election module for electing the monitor host in the data network.

17. The system as recited in claim 16, wherein the election module comprises:
   a. a retrieving module for retrieving priority and address of the one or more hosts; and
   b. an assessment module for determining the monitor host based on the priority and address of the one or more hosts.

18. A computer program product for use with a computer, the computer program product comprising a computer usable medium having a computer readable program code embodied therein for managing communication in a data network, the data network comprising a plurality of channels and a plurality of hosts, wherein each of the plurality of channels is connected to one or more hosts of the plurality of hosts in the data network, wherein each of the plurality of hosts is a data processing system, and wherein a monitor host is elected from the plurality of hosts, the computer program product performing the steps of:
   a. determining states of the plurality of channels and the plurality of hosts by the monitor host;
   b. updating the one or more hosts with the determined states;
   c. observing states of the plurality of channels by the one or more hosts;
   d. comparing the observed states with the determined states by the one or more host; and
   e. coordinating usage of the plurality of channels for communication in the data network, wherein the coordination is based upon updated states of the plurality of channels and the plurality of hosts, and wherein the updated states are determined by the monitor host based on the comparison performed by the one or more hosts.

19. A method for managing communication in a data network, the data network comprising a plurality of channels and a plurality of hosts, wherein each of the plurality of channels is connected to one or more hosts of the plurality of hosts in the data network, wherein each of the plurality of hosts is a data processing system, and wherein a monitor host is elected from the plurality of hosts, the method comprising:
   a. determining states of the plurality of channels and the plurality of hosts by the monitor host;
   b. updating the one or more hosts with the determined states by the monitor host, wherein the monitor host updates the one or more hosts by broadcasting a system state packet, and wherein the system state packet comprises the determined states;
   c. observing states of the plurality of channels by the one or more hosts;
   d. comparing the observed states with the determined states by the one or more hosts;
   e. broadcasting one or more host state packets to the plurality of hosts by the one or more hosts that identify at least one discrepancy between the observed states and the determined states, wherein the one or more host state packets comprises the observed states; and
   f. coordinating usage of the plurality of channels for communication in the data network, wherein the coordination is based upon updated states of the plurality of channels and the plurality of hosts, and wherein the updated states are determined by the monitor host based on the one or more host state packets.

20. A method for identifying a channel with minimal latency in a data network, the data network comprising a plurality of channels and a plurality of hosts, wherein each of the plurality of channels is connected to one or more hosts of the plurality of hosts in the data network, wherein each of the plurality of hosts is a data processing system, wherein a monitor host is elected from the plurality of hosts, and wherein the latency results from failure of one or more channels of the plurality of channels, the method comprising:
   a. updating the plurality of hosts regarding the failure of the one or more channels by broadcasting a system state packet to the plurality of hosts, wherein the system state packet comprises the states of the plurality of channels and the plurality of hosts is reported by the monitor host;
   b. waiting for the system state packet by each of the plurality of hosts;
   c. observing states of the one or more channels by the one or more hosts, wherein the one or more hosts update the observed states of the one or more channels to be down when the one or more hosts fails to receive the system state packet on the one or more channels;
   d. comparing the observed states of the one or more channels with the reported states, wherein the comparison is performed by each of the plurality of hosts;
   e. identifying failure of the one or more channels on the basis of one or more host state packets, wherein the one or more host state packets comprises states of the one or more channels observed by the one or more hosts;
   f. updating the system state packet by the monitor host on the basis of the one or more host state packets; and
   g. coordinating usage of the plurality of channels by the one or more hosts on the basis of the system state packet.

21. A system for managing communication in a data network, the data network comprising a plurality of channels and a plurality of hosts, wherein each of the plurality of channels is connected to one or more hosts of the plurality of hosts in the data network, wherein each of the plurality of hosts is a data processing system, and wherein a monitor host is elected from the plurality of hosts, the system comprising:
   a. a state determination module for determining states of the plurality of channels and the plurality of hosts, the state determination module further comprising:
      a storage means for storing the states of the plurality of channels and the plurality of hosts;
      a receiving module for receiving a system state packet from the monitor host, wherein the system state packet comprises the states of the plurality of channels and the plurality of hosts is determined by the monitor host;

a local updating module for updating the state of the plurality of channels and the state of the one or more hosts based on the system state packet;

a host state packet module for preparing and broadcasting one or more host state packets to the plurality of hosts; and a timing module for notifying internal processes about timelines for sending and receiving the system state packet and the one or more host state packets;

b. a system updating module for updating the one or more hosts with the determined states, wherein the monitor host updates the one or more hosts by broadcasting the system state packet;

c. a trigger module for comparing the determined states included in the system state packet with states of the plurality of channels observed by the one or more hosts; and d. a coordination module for coordinating the usage of the plurality of channels, wherein the coordination is based on updated states of the plurality of channels and the plurality of hosts, and wherein the updated states are determined by the monitor host based on the comparison performed by the one or more hosts.

* * * * *